F. L. SMITH.
PAN OR PLATE LIFTER.
APPLICATION FILED AUG. 4, 1919.
1,356,411.
Patented Oct. 19, 1920.
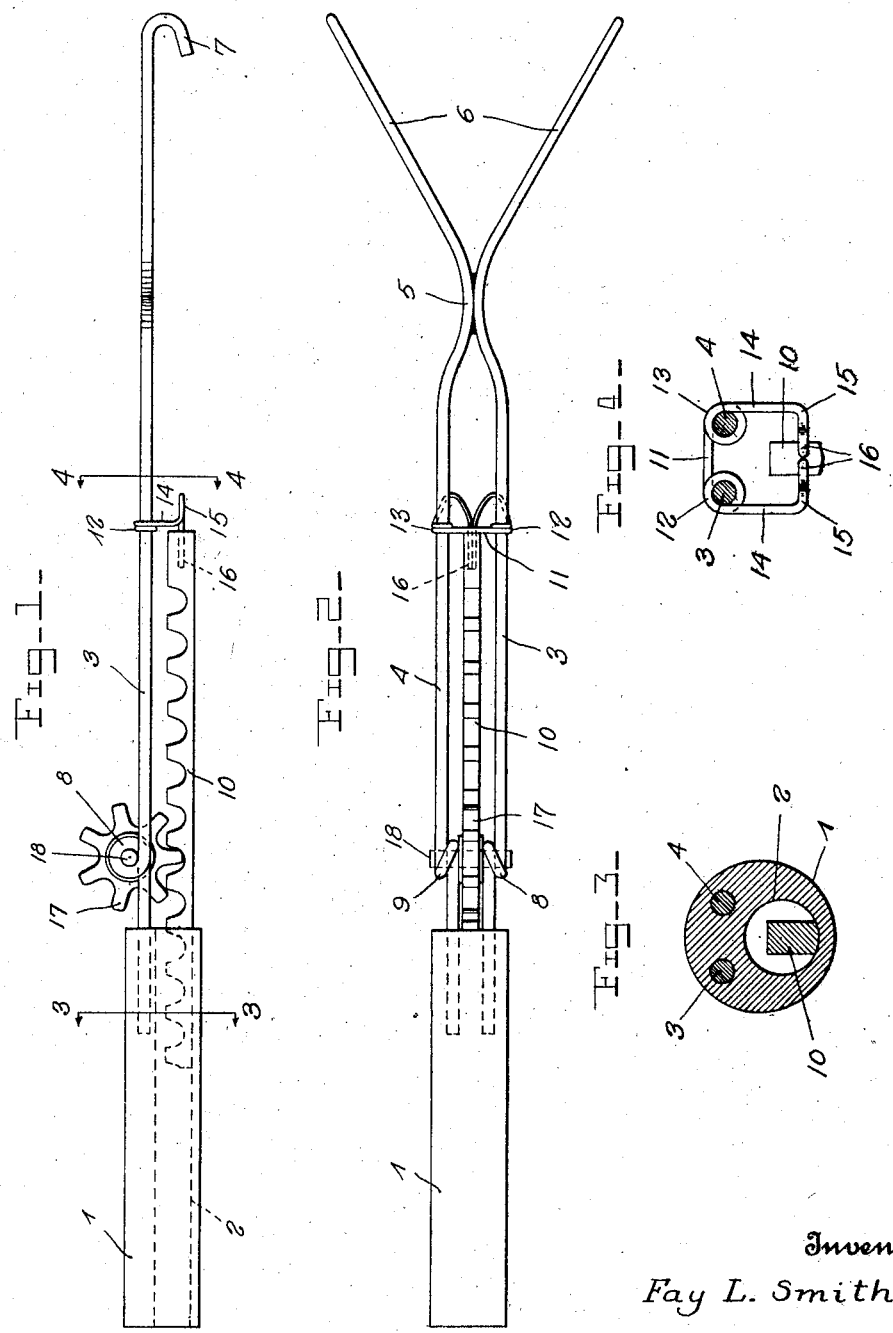
Inventor
Fay L. Smith.

UNITED STATES PATENT OFFICE.

FAY LEON SMITH, OF MOUNT VERNON, OHIO.

PAN OR PLATE LIFTER.

1,356,411.

Specification of Letters Patent.

Patented Oct. 19, 1920.

Application filed August 4, 1919. Serial No. 315,300.

*To all whom it may concern:*

Be it known that I, FAY L. SMITH, a citizen of the United States, residing at Mount Vernon, in the county of Knox and State of Ohio, have invented certain new and useful Improvements in Pan or Plate Lifters; and I do declare the following to be a full, clear, and exact description of the invention, such as will enable others skilled in the art to which it appertains to make and use the same.

This invention relates generally to kitchen utensils, and more particularly to pan or plate lifters.

The primary object of the invention is to provide a utensil by which a hot lid may be gripped and removed from a pot or pan without burning the hands, or by which an entire pot or pan or hot plate may be gripped and moved from place to place without bringing the hands in contact therewith.

Another object of the invention is to provide a lifter of this character which is adjustable to accommodate various sizes of pots, pans, plates and the like.

A further object of the invention is to provide a device of this nature which will be extremely simple, strong, durable and inexpensive in construction, efficient and reliable in operation and well adapted to the purpose for which it is designed.

With these and other objects in view, the invention consists of certain novel features of construction, and the combination and arrangement of parts as will be hereinafter fully described and claimed.

In the accompanying drawings forming a part of the specification, and in which similar reference characters designate like parts throughout the several views, Figure 1 is a side elevation of a device constructed in accordance with this invention;

Fig. 2 is a top plan view of the device; and,

Figs. 3 and 4 are transverse sectional views taken substantially on the planes indicated by the lines 3—3 and 4—4 respectively of Fig. 1.

The improved form of the invention comprises a cylindrical handle 1 having formed therein a longitudinally extending bore or opening 2, the latter being disposed eccentrically of the axis of the handle as clearly shown in Fig. 3 of the drawing. Connected to the forward end of the handle 1 is a bar composed preferably of a pair of spaced parallel rods 3 and 4 having their rear ends embedded in the forward end of the handle 1 to form the aforesaid connection with the latter, and having their forward ends curved inwardly as at 5 and soldered or otherwise connected together and then extended outwardly as at 6, and finally bent downwardly and inwardly as at 7, upon themselves, to form a means for engagement with the lip of a pot, pan, plate or the like. The rods 3 and 4 are provided with alined loops 8 and 9 respectively, the latter being disposed at a point adjacent the rear ends of the rods and close to the forward end of the handle 1.

Slidable longitudinally in the opening 2 is a rack 10, the forward end of which is connected to a member slidable upon the rods 3 and 4 and adapted to engage the lip of the pan or the like, at a point opposite the means 7. This member preferably consists of a wire 11 having formed in its intermediate portion a pair of spaced loops or eyes 12 and 13 through which the rods 3 and 4 respectively, extend. The wire 11 is then continued downwardly as at 14, then bent laterally or forwardly as at 15, and finally turned backwardly as at 16 with its ends embedded or otherwise secured to the forward end of the rack 10. The downwardly extending portions 14 of the wire and the forwardly extending portions 15 form the means for engaging the lip of the pan or the like at the point opposite the means 7.

The numeral 17 represents a pinion which is disposed between the rods 3 and 4 with its shaft 18 mounted in the loops 8 and 9 of said rods. The pinion 17 meshes with the rack 10 and moves the latter and also the member carried at its forward end longitudinally with respect to the rods 3 and 4. The teeth of the pinion 17 are of a suitable length and are spaced a convenient distance apart so that they may be easily engaged by the forefinger of the person using the device to rotate the same and move the movable engaging member toward or away from the relatively fixed engaging member.

From the foregoing description, taken in connection with the accompanying drawing, the construction, use and operation of the device will be readily understood without a more extended explanation.

Various changes in form, proportion, and in the minor details of construction may be resorted to without departing from the spirit of the invention as defined in the claims.

What is claimed is:—

1. A device of the class described comprising a handle having an eccentric longitudinal opening therein, a pair of spaced parallel rods having one of their ends embedded in one end of said handle and extending longitudinally therefrom, said rods having alined loops formed therein adjacent said ends and having their other ends brought and secured together and flared outwardly and provided with means for engaging the lip of a pan, a rack slidable longitudinally in the opening of said handle, a member carried at the forward end of said rack and slidable upon said rods and adapted to engage the pan at a point opposite said means, and a finger-operated pinion having its shaft mounted in said loops and meshing with said rack for moving said member upon said rods.

2. A device of the class described comprising a bar composed of a pair of spaced parallel rods having means formed thereon for engaging the lip of a pan, a rack slidable longitudinally with respect to said bar, a wire having spaced loops formed in its intermediate portion and then continued downward, then bent laterally forward and finally backward with its ends embedded in the forward end of said rack, said loops sliding upon said rods and the forward and backward extending portions of said wire being adapted to engage the pan at a point opposite said means, and a finger operated pinion mounted upon said bar and meshing with said rack.

In testimony whereof I have hereunto set my hand.

FAY LEON SMITH.